June 23, 1953  T. A. HANSEN  2,643,290
HIGH-SPEED TELEGRAPH TRANSMITTER
Filed April 1, 1950

INVENTOR
THEODORE A. HANSEN
BY Emery Robinson
ATTORNEY

Patented June 23, 1953

2,643,290

UNITED STATES PATENT OFFICE 2,643,290

HIGH-SPEED TELEGRAPH TRANSMITTER

Theodore A. Hansen, Park Ridge, Ill., assignor to Teletype Corporation, Chicago, Ill., a corporation of Delaware Application April 1, 1950, Serial No. 153,325

5 Claims. (Cl. 178—17.5)

The present invention relates to telegraph transmitters and more particularly to telegraph transmitters of a type utilizing the sensing of tape.

There are available commercially telegraph tape transmitters which operate through the sensing of permutations in a prepared tape to relay signal impulses through a rotating commutator to transmit such impulses over a telegraph line to a distant station. However, because of the fact that the tape sensing device must operate in conjunction with the commutator to transmit such impulses, the tape sensing pins may not be moved from the tape until such time as all of the impulses have been transmitted. This results, particularly in view of the fact that such motions are mechanical, in a speed of operation which is limited.

Accordingly, an object of the present invention is to provide a tape transmitter operating in conjunction with a tape sensing mechanism which is not limited in speed to an amount of the prior devices.

A further object of the present invention is to provide storage devices intermediate the tape sensing mechanism and the rotating commutator so that the operation of the former is not completely dependent upon the operation of the latter.

A still further object of the invention is to provide cold cathode tubes and associated condensers as storage devices intermediate the tape sensing mechanism and the rotating commutator.

Generally, the invention comprises a standard tape sensing mechanism which upon the sensing of apertures in the tape causes a contact pair to be closed resulting in an electrical charge being stored in a condenser. The condenser in turn is associated with a cold cathode tube which is connected to one of a plurality of segments of the commutator. In this manner as the segment of the commutator is traversed by the commutator brushes the cold cathode tube will be rendered conducting through the discharge of the potential stored in the condenser resulting in a marking impulse being transmitted over the signalling channel.

Figure 1:
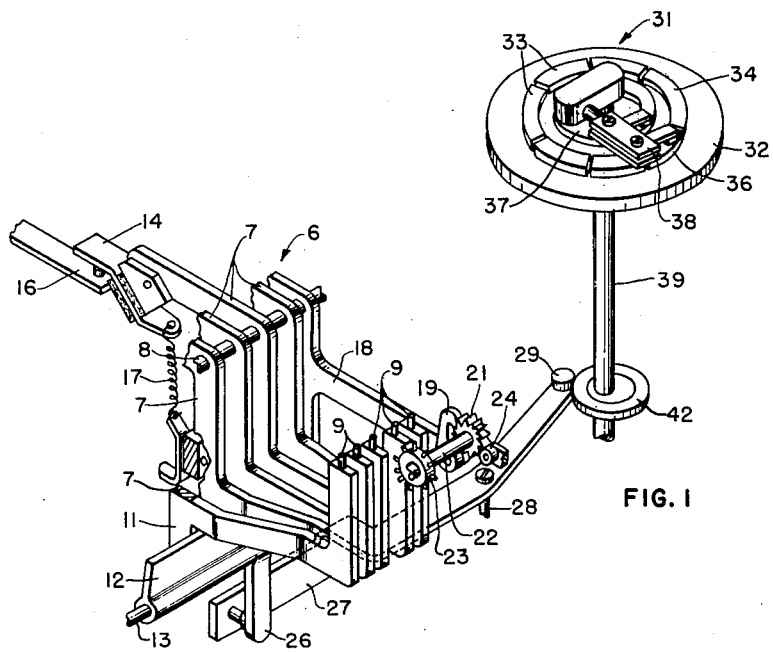
Figure 2:
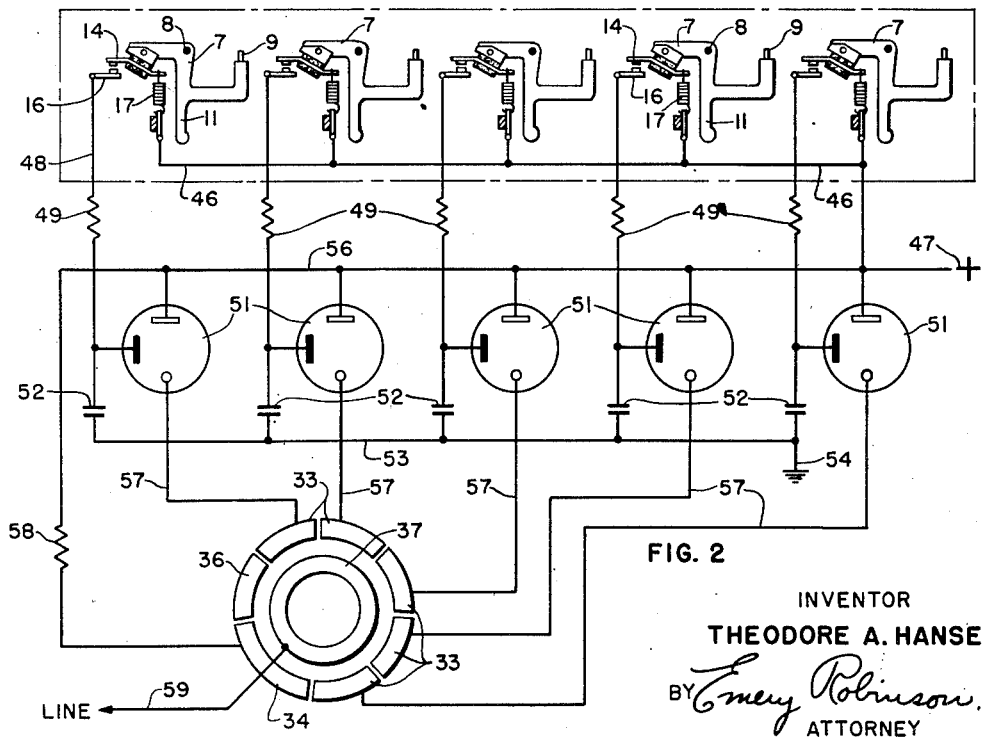

A full understanding of the invention may be had by reference to the following detailed description when read in conjunction with the accompanying drawings, in which Fig. 1 discloses a perspective schematic showing of the tape sensing mechanism and the associated commutator, and Fig. 2 illustrates a wiring diagram including certain mechanical elements diagrammatically.

Referring now to Fig. 1, the tape sensing mechanism is illustrated generally by the numeral 6 and is of a type available commercially and well known in the art. Such tape sensing mechanism may be understood in considerable detail by reference to the similar elements as disclosed in U. S. Patent No. 2,418,928 issued to W. R. Gemmel on April 15, 1947, or as shown in Bulletin No. 1041 issued in March, 1942, by Teletype Corporation.

Briefly, the tape sensing mechanism 6 comprises a plurality of levers 7 mounted pivotally on a shaft 8 and being provided at one extremity with individual tape sensing pins 9. The levers 7 are each provided with a downwardly extending portion 11 with which is associated an operating bail 12 which is mounted pivotally on a shaft 13. The opposite extremity of the levers 7 are each provided with an electrical contact 14, which in turn is associated with a stationary electrical contact 16. The levers 7 are each further provided with a spring 17 which normally tends to urge them in a counterclockwise direction to a position whereat the pins 9 will be sensing the associated tape, not illustrated.

A lever 18 is also provided which is mounted pivotally on the shaft 8 and which is provided at its forward extremity with a pawl 19. The pawl 19 operates in conjunction with a ratchet 21 which forms one end of a shaft 22, the opposite end of which is formed with a tape feeding wheel 23. A detent 24 cooperates with the ratchet 21 to prevent overtravel of the tape when operated by the pawl 19.

The bail 12 has a downwardly extending portion 26 which cooperates with one extremity of a lever 27 which is mounted pivotally at 28, the opposite extremity of which is provided with a cam follower 29.

A rotating commutator indicated generally by the numeral 31 is provided and comprises a face plate 32 which is formed with five code impulse segments 33, a stop impulse segment 34, a start impulse segment 36 and also a circular concentric ring 37. The segments mentioned above are traversed by a brush mechanism 38 which is mounted at the upper end of a shaft 39. The shaft 39 is rotated by means of a motor, not illustrated, and is provided with an eccentric cam 42 which cooperates operatively with the cam follower 29 of the lever 27.

At some time as the brush mechanism 38 traverses the code impulse segments 33 or the stop and start impulse segments 34 and 36 respectively, the eccentric cam 42 will cause the lever 27 to be pivoted in a counterclockwise direction about the pivot 28 resulting, through the projection 26, in the bail 12 being likewise rotated in a counterclockwise direction about its shaft 13. This results in the levers 7, through engagement with the portions 11, being rotated in a clockwise direction about the shaft 8 thereby removing the pins 9 from engagement with the tape. At the same time, through operation of the lever 18, the tape will be stepped a distance equal to the distance between succeeding rows of punched code apertures so that the next signal may be presented for sensing to the pins 9. Thereafter, as the brushes 38, shaft 39 and eccentric cam 42 rotate further the lever 27 will be allowed to return to its nonoperated position resulting in bail 12 no longer exerting pressure on the portions 11 of the levers 7, thereby allowing the springs 17 to once again regain control of the levers 7 and urge them in a position with the pins 9 sensing the code apertures in the tape.

As mentioned previously, a detailed understanding of the elements and the operation of the tape sensing mechanism 6 and the commutator 31 may be had by reference to the above identified patent and/or bulletin.

Referring now to Fig. 2, the sensing levers and contacts for the five code impulses are illustrated in their electrical combination with the other details omitted. Specifically, it may be seen that the contacts 14 associated with the levers 7 are connected electrically through the springs 17 and over a common conductor 46 to positive battery at 47. The contacts 16 are connected over individual conductors 48, in which are placed resistors 49, to individual starter anodes of cold cathode tubes 51 and also to individual condensers 52. The opposite side of the condensers 52 are connected over a common conductor 53 to ground 54.

The cold cathode tubes 51 have their main anodes connected by means of a common conductor 56 to positive battery at 47 and their cathodes connected over individual conductors 57 to the individual code impulse segments 33. The conductor 56, which is connected to positive battery 47, also extends through a resistor 58 to the stop impulse segment 34.

With respect to the various illustrated segments and continuous ring 37 in Fig. 2 it may further be seen that the start impulse segment 36 has no electrical connection and that the continuous ring 37 is connected by means of a conductor 59 to the telegraph line or signalling channel, with ground being supplied at the distant station.

It should be understood that when reference is made to the cooperating and connecting elements in the detailed description described above that the five tape sensing levers 7 are connected by means of their associated contacts to a corresponding one of five cold cathode tubes 51, which in turn are connected to individual ones of the code impulse segments 33. In this manner there is a sensing lever 7, cold cathode tube 51 and segment 33 for each of the five impulses of the well known Baudot code.

If it now be assumed that the lever 7, illustrated at the extreme left in Fig. 2, has been pivoted in a counterclockwise direction about the shaft 8, through the urging of the spring 17 and with the pin 9 entering an aperture in the tape, which corresponds to a marking impulse, it may be understood that the contact point 14 will then be in engagement with its associated contact point 16. When this occurs an electrical circuit will be partly established which may be traced from positive battery 47, over the common conductor 46, through the spring 17, through the contact pair 14—16, over the connecting conductor 48 to the associated condenser 52 wherein the positive charge will be stored. A similar condition will exist for any of the other four levers which may have been moved to their counterclockwise positions through their pins 9 sensing an aperture in the tape, indicating a marking impulse for that particular position.

If it may also be assumed that the brushes 38 are electrically bridging the stop impulse segment 34 with the continuous ring 37 at this time an electrical circuit will be established which may be traced from positive battery 47, over the common conductor 56, through the resistor 58 to the stop impulse segment 34, through the bridging brush mechanism 38 to the continuous ring 37, and thence over the conductor 59 to the telegraph line or signalling channel. In this manner a stop condition or marking on the line will exist which is a normal condition in commercial telegraphy.

In view of the fact that the brushes 38 and shaft 39 will thence rotate to the start impulse segment 36 the previous circuit will be broken through the brushes 38 no longer bridging the stop segment 34, and as the start impulse segment 36 is not connected by means of any conductor to any battery a start or no impulse condition will exist on the conductor 59. This is also standard telegraph practice and results in the receiving device at the distant station being released for operation in readiness for the receipt of the five code impulses.

Continuing in the natural sequence of rotation of the brushes 38 the next position will be traversal of the code impulse segment 33 which forms the No. 1 impulse of the code signal. If the original assumption is followed, that is, that the sensing lever 7 associated with the No. 1 impulse has been pivoted to its counterclockwise position with the subsequent closing of the contact pair 14—16 and the storage of potential in the condenser 52, at this time the condenser 52 will discharge its potential to the starter anode of the cold cathode tube 51 and through the tube to its cathode, thence over the conductor 57 to the No. 1 impulse segment 33, over the brushes 38 to the continuous ring 37 and thence over the conductor 59 to ground at the distant station. As is well known in the operation of cold cathode tubes, the discharge from the starter anode to the cathode is momentary only and thereafter the tube will continue to conduct but the path of discharge will be from the main anode to the cathode. Thus, in the instant example the circuit will now be completed from positive battery 47, over the common conductor 56 to the main anode of the cold cathode tube 51 associated with the No. 1 impulse position, through the tube to the cathode, and thence over the conductor 57 to complete the circuit as described for the completion of the circuit from the starter anode to the cathode. The tube 51 will continue to conduct as long as the brushes 38 traverse the No. 1 impulse segment 33, which will result in a marking impulse being transmitted over the line to the distant station for the No. 1 code impulse position.

If it is now assumed that the tape sensing lever 7 associated with the No. 2 impulse position, which is the lever 7 second from the left in Fig. 2 is in the position as illustrated with its contact pair 14—16 being open because there has been no aperture in the tape through which its pin 9 may sense, there will be no positive battery impressed to charge the condenser 52 associated with the No. 2 impulse position cold cathode tube 51. Therefore, at such time as the brushes 38 pass to the No. 2 code impulse segment 33 thereby completing a grounded circuit for the cold cathode tube 51 associated therewith, the tube will not be rendered conducting as there is no potential applied to its starter anode to initiate discharge. Thus, as the brushes 38 traverse the No. 2 impulse segment 33 there will be no potential impressed to the conductor 59 and a spacing or no signal impulse will be transmitted to the distant station.

It is obvious that as the brushes 38 continue in their clockwise rotation and traverse the Nos. 3, 4, and 5 impulse segments 33 marking or spacing impulses will be transmitted during those intervals in a manner similar as has been described for the marking condition for the No. 1 impulse position and the spacing condition for the No. 2 impulse position.

In view of the fact that the condensers 52 act as storage devices to retain the condition sensed by their associated code sensing levers 7 it becomes obvious that the only requirement to achieve a correct signal composed of five successive impulses being transmitted to the distant station is that the pins 9 be allowed to reach their sensing position with respect to the tape prior to the time that the brush mechanism 38 traverses the No. 1 impulse segment 33.

In previous mechanisms of this type wherein no storage means were provided the pins 9 could not be withdrawn from the sensing position until such time as the brushes had traversed all of the five code impulse segments. However, it becomes apparent that this is not true with respect to the instant apparatus, wherein as mentioned above, once the impulse conditions are stored in the condensers 52 the pins may be withdrawn at any time during the rotation of the brushes 38 over the impulse segments 33.

There is one timing limitation which does exist however, and that is that once a code signal condition has been stored in the condensers 52 that a succeeding signal condition may not be sensed in the tape by the pins 9, because if this were to occur it would be possible that an erroneous signal might be transmitted to the distant station. As an example, if the preceding No. 5 impulse might be stored as a spacing condition and a new signal were to be sensed before the No. 5 impulse were transmitted which had its No. 5 impulse condition as marking, the preceding signal would be transmitted incorrectly. Therefore, in the operation of the device certain timing must be utilized so that with a constant speed of rotation the pins 9 will not sense a succeeding signal condition in the tape until such time as the brush mechanism 38 has completed traversal of the No. 5 impulse segment 33.

Referring back now to Fig. 1, it should be remembered that the eccentric cam 42 on the shaft 39 was described as controlling the operation of the lever 27 through the follower cam 29 and thus the movement of the pins 9 with respect to the tape they are sensing, and also through the medium of lever 18 the stepping or movement of the tape. Therefore, it will be understood that the shape of the eccentric cam 42 will be such that the pins 9 will be positioned prior to traversal of the No. 1 impulse segment 33 and may be removed at any subsequent time, except that they may not be allowed to sense the succeeding signal condition until such time as the brush mechanism 38 has traversed completely the No. 5 impulse position segment 33.

It is believed apparent from the above description that if in the timing of the device and particularly the design of the cam 42 the pins 9 are not removed from sensing the code signal in the tape until such time for example as the brushes traverse the No. 3 impulse segment 33 it would not be necessary to include cold cathode tubes 51 and condensers 52 for the first two impulse segments 33, as no storage would be necessary. In such a case the two described segments 33 may be connected directly to their associated contacts 16.

While a single embodiment of the invention has been described in detail above it is obvious that the invention is not limited to such single embodiment but entails all embodiments within the scope and spirit of the invention.

What is claimed is:

1. In a tape transmitter utilizing a perforated record, means for advancing the record, a plurality of members for sensing the record, electrical contacts controlled in accordance with the sensing by said members, storage means controlled by said electrical contacts, whereby said means for advancing the record may be initiated after a selection is stored in said storage means, individual cold cathode tubes connected in circuit with said storage means, a distributor, and individual segments on said distributor connected in circuit with said cold cathode tubes, whereby when said segments are traversed said cold cathode tubes will be rendered conducting or not conducting under the control of said storage means and in accordance with the selection stored therein.

2. In a telegraph transmitter utilizing a perforated tape, means for advancing the tape, means for sensing the tape, electrical contact pairs controlled by said tape sensing means, condensers connected in circuit with said electrical contact pairs for storing charges in accordance with the sensing of the tape, whereby said means for advancing the tape may be initiated after a selection is stored in said condensers, a plurality of cold cathode tubes each connected in circuit with one of said condensers and a pair of said electrical contacts which are rendered conducting or not conducting at predetermined intervals in accordance with whether said condenser associated therewith has been charged, and transmitting means for permitting said cold cathode tubes to be rendered conducting at the predetermined intervals.

3. In a telegraph transmitter utilizing a perforated tape, means for advancing the tape, means for sensing the tape, electrical contact pairs controlled by said tape sensing means, condensers connected in circuit with said electrical contact pairs for storing charges in accordance with the sensing of the tape, whereby said means for advancing the tape may be initiated after a selection is stored in said condensers, a plurality of cold cathode tubes each connected in circuit with one of said condensers and a pair of said electrical contacts which are rendered conducting or not conducting at predetermined intervals in accordance with whether said condenser associated therewith has been charged, transmitting means for permitting said cold cathode tubes to be rendered conducting at predetermined intervals, and means controlled by said transmitting means for operating said tape sensing means.

4. In a telegraph transmitter utilizing a perforated tape, means for sensing the tape one character at a time, storage means controlled by said tape sensing means, a commutator for transmitting the characters under the control of said storage means, and means controlled by said commutator for causing said tape sensing means to stop sensing a character in the tape prior to the time that all of its components are transmitted by said commutator but after the selection is stored in said storage means and for sensing the succeeding character after all of the components have been transmitted.

5. In a tape transmitter utilizing a perforated tape, means for advancing the tape, means for sensing the tape, electrical contact pairs controlled by said tape sensing means, condensers connected in circuit with said electrical contact pairs for storing charges in accordance with the sensing of the tape, whereby said means for advancing the tape may be initiated after a selection is stored in said condensers, a plurality of cold cathode tubes each connected in circuit with one of said condensers, a transmitting distributor including code segments and brush means, and circuits connecting individual of said distributor segments with said cold cathode tubes, whereby when said segments are traversed by said brush means said cold cathode tubes will be rendered conducting or not under the control of said storage means and in accordance with the selection stored therein.

THEODORE A. HANSEN.

References Cited in the file of this patent

UNITED STATES PATENTS

| Number | Name | Date |
|---|---|---|
| 1,332,976 | Dowd | Mar. 9, 1920 |
| 2,006,582 | Callahan et al. | July 2, 1935 |
| 2,302,081 | Weitmann | Nov. 17, 1942 |
| 2,382,251 | Parker et al. | Aug. 14, 1945 |
| 2,554,835 | Mallina | May 24, 1951 |